No. 719,480. PATENTED FEB. 3, 1903.
V. LAPP.
METHOD OF ACCELERATING THE PRODUCTION OF WORT.
APPLICATION FILED JUNE 26, 1901.
NO MODEL.
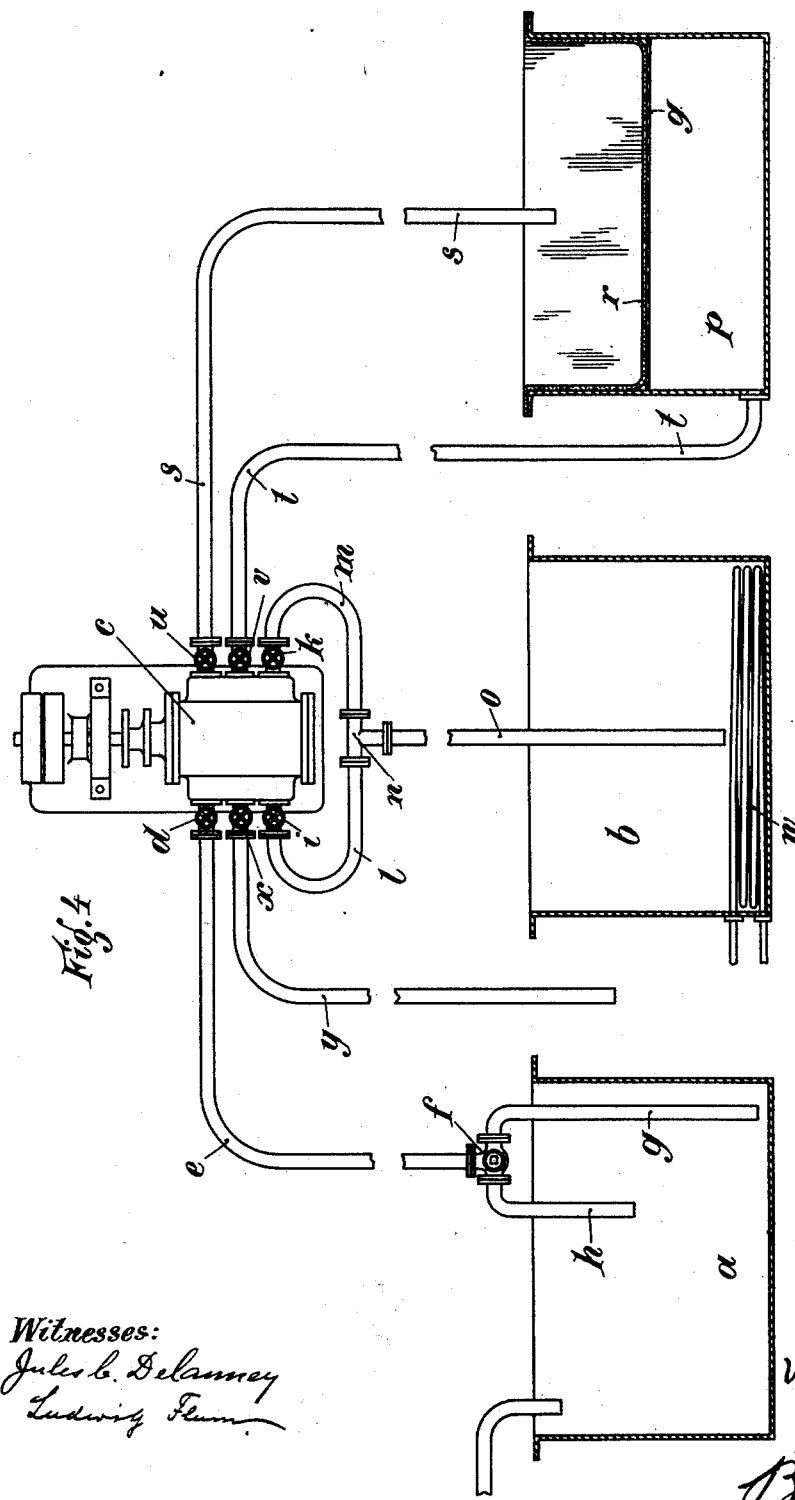

UNITED STATES PATENT OFFICE.

VALENTIN LAPP, OF LINDENAU, GERMANY.

METHOD OF ACCELERATING THE PRODUCTION OF WORT.

SPECIFICATION forming part of Letters Patent No. 719,480, dated February 3, 1903.

Application filed June 26, 1901. Serial No. 66,157. (No specimens.)

*To all whom it may concern:*

Be it known that I, VALENTIN LAPP, a subject of the King of Saxony, residing at Lindenau, near Leipsic, in the Kingdom of Saxony, Germany, have invented a new and useful Method of Accelerating the Production of Wort from Malt Separated into the Contents of the Grains and the Husks, of which the following is a specification.

This invention relates to a method of accelerating the production of wort from malt previously separated into the contents of the grains and the husks, and resides in a particular mode of treatment of the mash produced from the contents of the grains.

The process is included in that series of phases enumerated hereinafter under one to seventeen; but the invention—*i. e.*, the new and improved process—commences only at the phase ten, whereas the preceding phases are known singly, as well as in that combination and sequence. In carrying the process into effect I make use of a suitable arrangement and combination of parts—such as a mashing-vat, a boiling-vat, a filtering-vat, a pump, pipes, cocks or valves, and the like; but, as the particular arrangement and combination may vary, I wish it to be understood that the plant represented diagrammatically in the accompanying drawings is and shall be nothing else but an example. In the drawings—

Figure 1 is a vertical section through a mashing-vat. Fig. 2 is a vertical section through a boiling-vat. Fig. 3 is a vertical section through a filtering-vat, and Fig. 4 is a plan of a pump and of pipes connecting the pump with said vats.

After the crushed contents of the grains of the malt have been mashed in the usual manner in the mashing-vat $a$, Fig. 1, (first phase,) the mashing-water having a temperature of from 35° to 37½° centigrade, the thicker part is pumped into the boiling-vat $b$, (second phase.) The connection of the pump $c$ with the vat $a$ is obtained by a valve $d$, a pipe $e$, a three-way cock $f$, and two pipes $g$ and $h$, the pipe $g$ terminating shortly above the bottom of the vat and serving for sucking off said thicker part of the mash, whereas the shorter pipe $h$ serves for sucking off the liquor proper. The connection of the pump $c$ with the boiling-vat $b$ is obtained by two valves $i$ $k$, two pipes $l$ $m$, a T-pipe $n$, and a pipe $o$, the position of the cock $f$ at the time being such that the pipes $e$ and $g$ are in connection with each other. The valves $d$ and $k$ are open. All the others are closed. On the bottom of the vat $b$ is a coil $w$. As soon as the thicker part of the mash has been pumped into the vat $b$ steam is made to pass through the coil $p$ and the mash is slowly heated to boiling temperature and boiled, (third phase,) whereafter the boiled mash is pumped back into the vat $a$ and is mixed with that portion of the first mash remaining in the vat $a$, (fourth phase,) the temperature of this mixture being now about 50° centigrade, due to the mixing of the boiled or heated mash from the vat $b$ and that remaining in the vat $a$. In this phase there occurs a partial dissolution and a slight saccharification of the starch. When this has occurred, the thick part of the thus far treated mash is again pumped into the boiling-vat $b$, (fifth phase,) the pipes and cocks employed being, of course, the same as in the first case, and is first slowly heated to about 80° centigrade, after which the temperature is quickly raised to the boiling-point, (sixth phase.) The hot mash is then again led back into the mashing-vat and is again mixed with the rest of mash therein contained, (seventh phase,) this mixture having then a temperature of about 65° centigrade. During this phase a further dissolution and a further, although but slight, saccharification of the starch occurs. The solid components of the mash are now allowed to settle, (eighth phase,) and the liquor collecting or remaining above the solid parts is drawn off and conducted into the boiling-vat, (ninth phase,) the position of the cock $f$ being now such that the pipes $e$ and $h$ are in connection with each other. When the mash has been thus far prepared, it is further treated according to the new process hereinafter detailed.

Tenth phase: The mixture of the solid parts with the rest of the liquor remaining in the washing-vat is separated into these components—*i. e.*, the solid parts and the liquor. This separation is effected in a separate vat $p$, having an intermediate bottom $q$ (sieve-bottom or the like) and a filtering-cloth $r$ placed upon that bottom, so that the liquor is cleared simultaneously with being separated from the residues, the latter being retained within the filtering-cloth $r$. The connection of the vat $p$ with the pump $c$ is effected by a pipe $s$, intended for conducting the mixture into the upper part of the vat or upon the filtering-cloth $r$, and by a pipe $t$, intended to convey the filtered liquor away from the lower part of the vat. Valves $u$ and $v$ serve for establishing or interrupting the connection between the pump $c$ on one side and the pipes $s$ or $t$ on the other side. The object of the separation of the liquor from the solid parts is to prevent the liquor which contains diastase from being impaired by that treatment which the solid parts in the further course of the process are exposed to for the purpose of being further dissolved.

Eleventh phase: The residues collecting upon the filtering-cloth $r$ are conveyed by any suitable means to and into the mashing-vat $a$ and are there mixed with hot water, whereafter the mixture is conducted through $g, f, e, d, c, k, m, n$, and $o$ to the liquor present in the boiling-vat $b$, all the other pump-valves $u\ v\ i\ x$ being, of course, closed. Steam is then made to pass through the coil $w$, so as to heat and boil the whole of that mixture. When this point has been reached, the steam is turned off, so as to prevent any further supply of heat. The mixture or mash is then thoroughly stirred or agitated, so as to effect a reduction of temperature to about 88° or 85° centigrade. The starch is in this phase completely dissolved, but not yet completely saccharified. This latter occurs only when the liquor, mentioned hereinafter in the phases thirteen and fourteen, is conducted to the cleared liquor (see phase twelve) contained in the mashing-vat, this liquor being rich in diastase.

Twelfth phase: The cleared liquor obtained in the tenth phase by filtering from the solid parts is led back into the empty mashing-vat through $t\ v\ c\ d\ e\ h$, so as to make the vat $p$ free for the reception of the liquor resulting from the subsequent phase, (thirteen.)

Thirteenth phase: The mixture mentioned in the eleventh phase is now pumped from the vat $b$ to and into the vat $p$ through $o\ n\ l\ i\ c\ u\ s$ and separated by the sieve-bottom $q$ and the filtering-cloth $r$ into liquor and solid parts, the liquor collecting in the lower part of the vat and the solid parts remaining in the upper part of the same.

Fourteenth phase: Water is poured upon the solid residues from the foregoing phase, (thirteen,) and the mixture thus obtained is again separated by the filtering-cloth $r$ into solid residues and liquor, the latter collecting also in a cleared state in the lower part of the vat and mixing with the cleared liquor therein retained from the preceding phase, (thirteen.) The starch that was contained in the solid parts is now completely extracted and dissolved.

Fifteenth phase: This clear mixture thus obtained is pumped through $t\ v\ c\ d\ e\ f\ h$ to and mixed with the clear wort retained (as product from the twelfth phase) in the mashing-vat $a$, and as the temperature of the whole mixture is such as is requisite for the saccharification, all the starch contained in the mixture is saccharified by the diastase contained in the clear wort aforementioned.

Sixteenth phase: The wort thus produced is pumped into the vat $b$ and boiled, whereby certain chemical bodies which might make the beer turbid are segregated out of the wort.

Seventeenth phase: The boiled wort is pumped into the vat $p$ and filtered, whereby the segregated bodies mentioned in the preceding phase are completely separated from the wort. The thus finished wort is led off through pipe $t$, valve $v$, pump $c$, valve $x$, and pipe $y$.

Concerning the tenth, thirteenth, and fourteenth phases, attention is called to the fact that the separation of the respective mixtures into liquor and solid components may be effected under pressure, in which case the vat $p$ should be closed by any suitable means. The pressure may be produced by compressed air or carbonic acid.

Having now described my invention, what I desire to secure by a patent of the United States is—

The method of manufacturing wort, consisting in mashing the malt, separating the mash into a thin and a thick part and heating and boiling the latter, mixing the boiled thick part with the separated thin part, separating the thus obtained mash again into a thin and a thick part and heating the latter slowly and causing it quickly to boil, mixing this boiled thick part of the mash with the separated thin part, separating the thus obtained mash again into a thin and a thick part and separating also the latter into liquor and solid components, mashing the latter with hot water and adding this mash to the lastly-mentioned thin part, heating and boiling the thus obtained mixture and separating it then into liquor and solid components, mashing the latter with water, separating this mash again into liquor and solid components, mixing this liquor with the aforementioned liquor and adding the mixture to the first-mentioned liquor, boiling this whole mixture and clarifying it, as set forth.

In witness whereof I have hereunto set my hand in presence of two witnesses.

VALENTIN LAPP.

Witnesses:
RUDOLPH FRICKE,
CHAS. J. BURT.